March 9, 1926.

O. M. FAGLEY

DRIP AND OTHER REFRIGERATOR PAN

Filed Jan. 9, 1924

1,576,319

ON LINE 3-3. FIG.1.

INVENTOR:
Oliver M. Fagley.
BY
ATTORNEYS

Patented Mar. 9, 1926.

1,576,319

UNITED STATES PATENT OFFICE.

OLIVER MILLER FAGLEY, OF PHILADELPHIA, PENNSYLVANIA.

DRIP AND OTHER REFRIGERATOR PAN.

Application filed January 9, 1924. Serial No. 685,121.

*To all whom it may concern:*

Be it known that I, OLIVER MILLER FAGLEY, a citizen of the United States, residing in the city and county of Philadelphia, State of Pennsylvania, have invented new and useful Drip and Other Refrigerator Pans, of which the following is a specification.

In the manufacture of sheet metal vessels and utensils, which are usually made of sheet tin, or galvanized iron, such as drip pans, refrigerator pans and the like, it is customary to make the bottom of a plain sheet of galvanized tin and secure it to the bottom of the body, thus leaving the bottom a smooth plain surface, so that vessels thus made soon have the galvanized coating worn off by friction, abrasion or corrosion especially near the edge of the bottom on its exterior, and in addition holes are liable to be formed in the bottom by abrasion and corrosion or rusting of the exposed portions, thereby destroying the utility of the vessel, even though its body portion remains unimpaired. Another well known source of injury to such vessels, especially when used for holding liquids, is that they corrode or rust on the outside due to sweating especially at and around the lower seams or joints. To prevent these injurious results, I construct the bottom of such vessels with non-corrodible feet or projections, the number of which may be varied according to the size of the vessel, and so located and of such a size as to support the vessel and its contents, and prevent the bottom plate from touching or coming in contact with the surface upon which the vessel is set or rests when in use, whereby a free circulation of air is permitted around and under the vessel so that the liability of corrosion is prevented, and the bottom of the vessel is protected from wear.

To the above ends my invention consists of the novel construction of noncorrodible feet and the manner of attaching the same to the bottom of the vessel, all as will be hereinafter fully pointed out in the specification and claim appended hereto.

It further consists of other novel features of construction and advantage as will be hereinafter pointed out.

For the purpose of illustrating my invention, I have shown in the accompanying drawings one form thereof, which is at present preferred by me, since the same will give in practice satisfactory and reliable results, although it is to be understood that the various instrumentalities of which my invention consists, may be variously arranged and organized and my invention is not limited in this precise arrangement and organization of these instrumentalities as herein shown and described.

Figure 1:
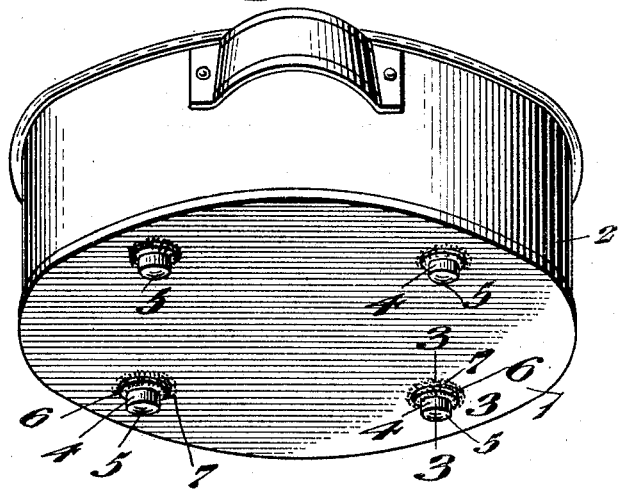
Figure 1 represents a perspective view of a drip or other pan embodying my invention.
Figure 2:
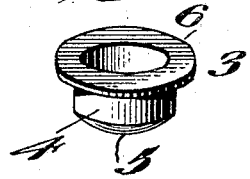
Figure 2 represents on an enlarged scale, a perspective view of one of the noncorrodible feet detached.
Figure 3:
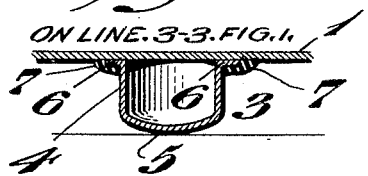
Figure 3 represents a section on line 3—3, Figure 1.

In carrying out my invention, I attach to the bottom 1 of the drip or other pan 2 of galvanized iron or the like the hollow feet 3, which are formed preferably of thin sheet brass or similar noncorrodible metal and are preferably of the shape of a thin shell or cylinder 4, having a convex base, an open top and a laterally extending top flange 6, which is adapted to abut against the bottom 1 and to be held in position thereagainst, by soldering as indicated at 7 in Figure 3. These feet are preferably four in number, and their number may obviously be increased or diminished according to requirements.

By making said feet hollow the weight is not greatly increased, and by making the bottoms 5 convex or curved, the pan can be readily slid along the floor to or from any desired points. The feet can be readily stamped or pressed in quantities out of thin sheet metal at a minimum expense, and the provision of the flange 6 enables any foot to be instantly applied to the desired points on the bottom, 1, and soldered thereto in an expeditious manner by unskilled labour, and these is no piercing of the bottom 1 for rivets required, with the consequent liability of leakage, which has been heretofore proposed in prior constructions with which I am familiar.

It will be evident that the bottom 1 of the pan will be raised from the support or surface upon which the feet 3 rest and will be prevented from coming in contact with said supporting surface, so that there will be no liability of abrasion, corrosion or rusting of the exposed surfaces and in addition there will be a free ventilation under the bottom 1, so that there will be no liability of sweating on said bottom or near its seam with the annular pan body caused by particles of moisture adhering thereto, which is one of the common causes of corrosion of said bottoms, whereby the life of the pan is greatly prolonged by my invention.

It will thus be seen that by my invention I prevent wear upon the bottom of sheet metal vessels and also corrosion thereby greatly increasing their utility and value. While I have described my invention as being applicable to pans as refrigerator drip pans and the like, it will be evident that it is adapted to other analogous uses, as well.

It will now be apparent that I have devised a novel and useful drip and other refrigerator pan which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

In a sheet metal vessel, a bottom and a plurality of noncorrodible feet secured thereto, said feet each comprising a hollow cylindrical member open at its top and provided with an annular top flange and a closed convex bottom, said flange being soldered to said vessel bottom to completely cover and hide from view said flange.

OLIVER MILLER FAGLEY.